United States Patent
Gu et al.

(10) Patent No.: US 9,910,554 B2
(45) Date of Patent: Mar. 6, 2018

(54) ASSISTING GRAPHICAL USER INTERFACE DESIGN

(71) Applicant: INTERNATIONAL BUSINESS MACHINES CORPORATION, Armonk, NY (US)

(72) Inventors: Yang Gu, Shang Hai (CN); Dong Huang, Shang Hai (CN); Dale M. Schultz, Limerick, ME (US); Yan Min Sheng, Shang Hai (CN)

(73) Assignee: International Business Machines Corporation, Armonk, NY (US)

(*) Notice: Subject to any disclaimer, the term of this patent is extended or adjusted under 35 U.S.C. 154(b) by 713 days.

(21) Appl. No.: 13/947,390

(22) Filed: Jul. 22, 2013

(65) Prior Publication Data

US 2014/0089827 A1    Mar. 27, 2014

(30) Foreign Application Priority Data

Sep. 21, 2012 (CN) .......................... 2012 1 0360655

(51) Int. Cl.
*G06F 3/048* (2013.01)
*G06F 3/0481* (2013.01)
*G06F 9/44* (2018.01)

(52) U.S. Cl.
CPC .............. *G06F 3/0481* (2013.01); *G06F 8/38* (2013.01); *G06F 9/4448* (2013.01)

(58) Field of Classification Search
CPC ........ G06F 9/4443; G06F 9/4448; G06F 8/38; G06F 3/0481
See application file for complete search history.

(56) References Cited

U.S. PATENT DOCUMENTS

| | | | |
|---|---|---|---|
| 5,416,903 A * | 5/1995 | Malcolm ....................... | 715/703 |
| 5,812,847 A | 9/1998 | Joshi et al. | |
| 5,974,372 A * | 10/1999 | Barnes et al. .................... | 704/8 |
| 6,396,515 B1 * | 5/2002 | Hetherington et al. ...... | 715/762 |

(Continued)

FOREIGN PATENT DOCUMENTS

| CN | 1364260 A | 8/2002 |
|---|---|---|
| CN | 102402432 A | 4/2012 |

OTHER PUBLICATIONS

IBM Corporation, "Internationalization of graphical images", Downloaded: Jun. 20 2013 http://www-01.ibm.com/software/globalization/topics/graphics/design.html.

(Continued)

*Primary Examiner* — Kieu Vu
*Assistant Examiner* — Asteway T Gattew
(74) *Attorney, Agent, or Firm* — Stephen J. Walder, Jr.; Richard A. Wilhelm (57) ABSTRACT

A method for assisting graphical user interface design includes extracting a first interface element from a first GUI under a first cultural background; searching in a rule repository for at least one transformation rule corresponding to the first interface element, where each of the at least one transformation rule includes at least an action taken on the first interface element; based on the at least one transformation rule, transforming the first interface element into a second interface element under a second cultural background; and providing a second user interface comprising at least the second interface element.

20 Claims, 7 Drawing Sheets

(56) References Cited

U.S. PATENT DOCUMENTS

| | | |
|---|---|---|
| 8,407,611 B2 | 3/2013 | Zhang et al. |
| 2002/0091510 A1* | 7/2002 | Forrest et al. .................... 704/8 |
| 2002/0101449 A1 | 8/2002 | Friskel |
| 2003/0079051 A1 | 4/2003 | Moses et al. |
| 2004/0183832 A1 | 9/2004 | Baccou |
| 2006/0132500 A1* | 6/2006 | Santoli ..................... G06T 3/60 345/619 |
| 2009/0083697 A1 | 3/2009 | Zhang et al. |
| 2010/0131916 A1 | 5/2010 | Prigge |
| 2011/0016423 A1 | 1/2011 | Brubaker |
| 2011/0145736 A1 | 6/2011 | Mahr et al. |

OTHER PUBLICATIONS

Bajwa et al., "A language engineering system for graphical user interface design (lesguid): A rule based approach", Proceedings of 2nd IEEE International Conference on Information & Communication Technologies, ICTTA'06 Apr. 24-28, 2006.

Marcus et al., "Globalization of user-interface design for the web", HFWEB Jun. 3, 1999.

Marcus et al., "Cross-cultural user-interface design: what? so what? now what?", CHI EA '00 CHI '00 Extended on Human Factors in Computing Systems, p. 299, Apr. 1-6, 2000.

\* cited by examiner

ASSISTING GRAPHICAL USER INTERFACE DESIGN

Embodiments of the present invention relate to a graphical user interface (GUI), and more specifically, to a method and apparatus for assisting GUI design.

With the development of computer technology, various applications have been penetrated into every aspect of people's work and life. Users become increasingly demanding on the user interface of an application while requiring the application have perfect functions. On the one hand, an interface design is required to be more friendly for facilitating user operation, and on the other hand, the visual effect of the interface is required to meet aesthetic standards of users under different cultural backgrounds while conforming to their use habits.

However, a problem in GUI design is that users under different cultural backgrounds have different requirements on the GUI, such as different aesthetic standards, different language environments, different representation formats of date and time, etc. When the GUI designed by a GUI designer is transplanted from a source cultural background (e.g., Chinese culture) to a target cultural background (e.g., American culture), the layout and/or visual effect of the original UI might be lost. For example, since Chinese and English words with the same meaning might vary in length, words cannot be completely displayed in reserved space, and even confusion such as character overlap might occur on the UI. For another example, when a target language is written from right to left, such as Arabic and Hebrew, more problems will arise.

During GUI design, currently no tool has been proposed that can assist designers to preview the visual effect of the GUI under different cultural backgrounds. After an interface is designed and transplanted to other cultural background, if a problem arises, designers have to return to the design phase for modifying the original design. On one hand, this extends the software development cycle, and on the other hand, it consumes enormous manpower and material resources in vain.

With the trend of software globalization, during the preliminary design phase software developers pay more and more attention to how to adapt software GUI to different cultural backgrounds. This has brought GUI design under multicultural backgrounds into a focus of attention.

SUMMARY

Therefore, it is desired to develop a technical solution capable of assisting graphical user interface design, and also it is desired that the solution can assist a designer to preview, during the design phase of a graphical user interface, the visual effect of the designed interface transplanted to a different cultural background. Further, it is desired that the solution can customize rules to be followed during transplantation, for example, which transformation operations should be performed on different elements in the designed interface. On the basis of previewing the visual effect of the designed interface under a different cultural background, the designer can adjust, at any time, the layout and effect of various design elements in the designed interface; thereby the design progress is facilitated.

According to various aspects of the present invention, a method, system and program product for assisting graphical user interface design are provided. The method includes: extracting a first interface element from a first graphical user interface (GUI) under a first cultural background; searching in a rule repository for at least one transformation rule corresponding to the first interface element, where the at least one transformation rule includes at least an action taken on the first interface element; based on the at least one transformation rule, transforming the first interface element into a second interface element under a second cultural background; and providing a second GUI comprising at least the second interface element.

According to one aspect of the present invention, the at least one transformation rule is searched for based on a type of the first interface element.

With the method, system and program product of the present invention, while changing an existing graphical user interface design flow as little as possible, it is possible to greatly reduce the manpower and material resources as consumed in considering multicultural backgrounds, which further improves the design efficiency of the graphical user interface. In addition, it is possible to preview possible problems in the designed interface under multicultural backgrounds and adjust the original design appropriately.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
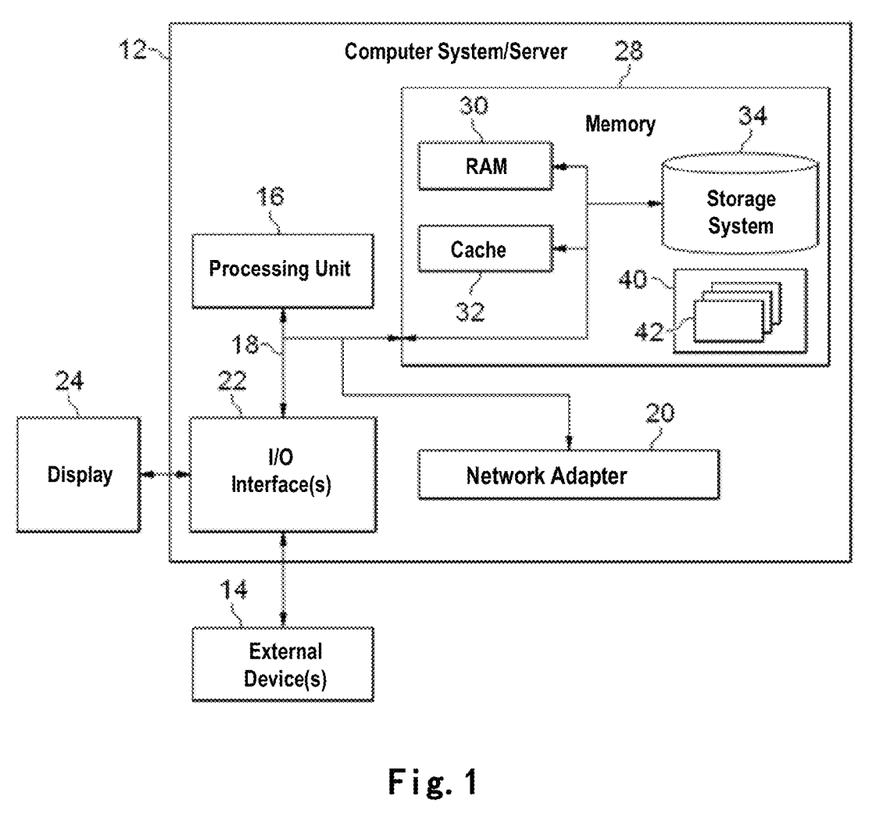
FIG. 1 illustrates an exemplary computer system 100 which is applicable to implement the embodiments of the present invention.

FIG. 1 illustrates an exemplary computer system/server 12 which is applicable to implement the embodiments of the present invention. The computer system/server 12 as illustrated in FIG. 1 is only an example, which should not construct any limitation to the functions and application scope of the embodiments of the present invention.

As illustrated in FIG. 1, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically comprises various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not illustrated in FIG. 1, generally called "a hard disk driver"). Although not illustrated in FIG. 1, a magnetic disk driver for reading/writing a mobile, non-volatile magnetic disk (for example, a "floppy disk") and an optical disk driver for reading/writing a mobile, non-volatile optical disk (for example, CD-ROM, DVD-ROM, or other optical medium) may be provided. In these cases, each driver may be connected to the bus 18 via one or more data medium interfaces. The memory 28 may comprise at least one program product that has a set (for example, at least one) program modules, and these program modules may be configured to perform the functions of various embodiments of the present invention.

A program/utility tool 40 comprising a set of (at least one) program module 42 may be stored in for example the memory 28; such program module(s) 42 can include, but are not limited to, an operating system, one or more applications, other program modules, and program data, and each of these examples or a certain combination thereof might comprise implementation of a network environment. The program module 42 generally executes the functions and/or methods in the embodiments as described according to the present invention.

The computer system/server 12 may also communicate with one or more peripheral devices 14 (for example, a keypad, a pointing device, a display 24, etc.), and may also communicate with one or more devices that enable the user to interact with the computer system/server 12 and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As illustrated in the figure, a network adapter 20 communicates with other modules of the computer system/server 12 via the bus 18. It should be appreciated that although not illustrated in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

Currently, some design assistance tools have been already evolved (e.g., Maqetta, which may be obtained at http://www.maqetta.org). These tools support dragging/dropping various elements in interface design so as to adjust the layout and visual effect of the interface design. However, they can only support designers to design in specific cultural backgrounds but do not support a preview of interface design in other cultural background during the design phase.

Figure 2A:
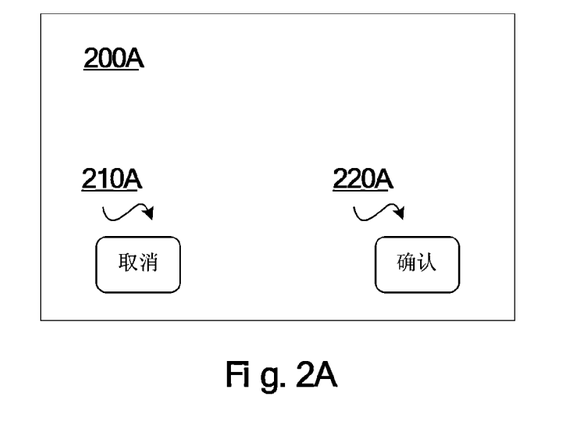
FIGS. 2A-2C each schematically illustrate a diagram of a user interface under a different cultural background formed according to one solution.
Figure 2B:
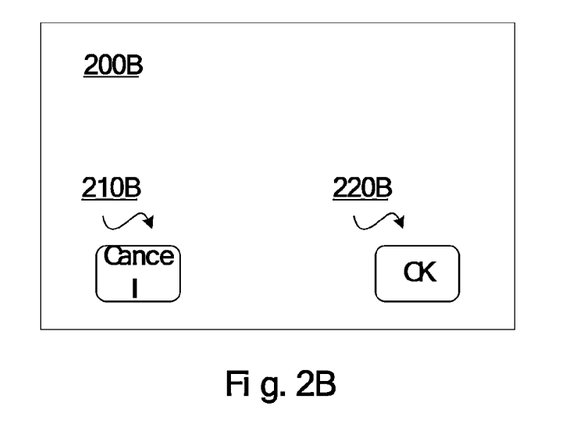
Figure 2C:
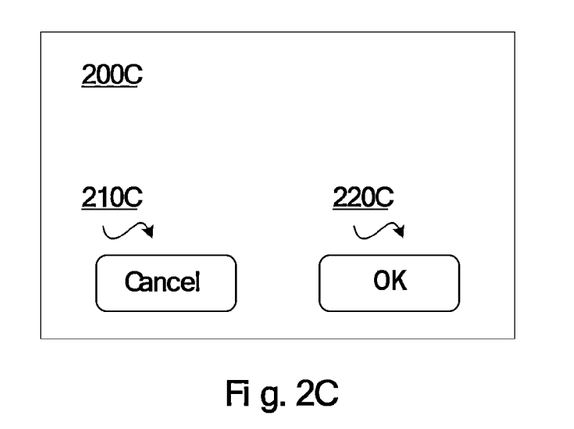

FIGS. 2A-2C each schematically illustrates a diagram of a user interface under a different cultural background formed according to one solution. FIG. 2A illustrates a user interface developed by a designer under his/her own cultural background (e.g., Chinese). At this point, the words in the interface are Chinese and a size of each control in the interface is designed according to the Chinese format. Reference numerals 210A and 220A represent button controls "取消" (i.e., Cancel) and "确认" (i.e., OK), respectively.

When the user interface illustrated in FIG. 2A is transplanted to another cultural background (e.g., American), an interface is as illustrated in FIG. 2B. Note since the language of the words presented in buttons 210B and 220B is changed from Chinese to English, the size of button 210B is no longer suitable to appropriately display "Cancel." According to a prior art solution, designers have to return to the design phase to adjust the size of the button 210A sized under the Chinese cultural background, so that the words (as illustrated in FIG. 2C) can be completely displayed with appropriate formatting in buttons 210C and 220C when transplanted to the American cultural background.

To solve the above problem, the present invention provides a method for assisting graphical user interface design, including: extracting a first interface element from a first graphical user interface under a first cultural background; searching in a rule repository for at least one transformation rule corresponding to the first interface element, where the at least one transformation rule includes at least an action taken on the first interface element; based on the at least one transformation rule, transforming the first interface element into a second interface element under a second cultural background; and providing a second graphical user interface including at least the second interface element.

Note the assistance tool used during GUI design as provided by the present invention can help designers to preview, during the design phase, the visual effect of the GUI under various cultural backgrounds and further take into consideration problems that will be encountered while transplanting software to other cultural backgrounds in the later. Note the present invention does not simply translate the graphical user interface, but transforms, based on transformation rules, various interface elements of the user interface to meet the requirements of a target cultural background.

Figure 3:
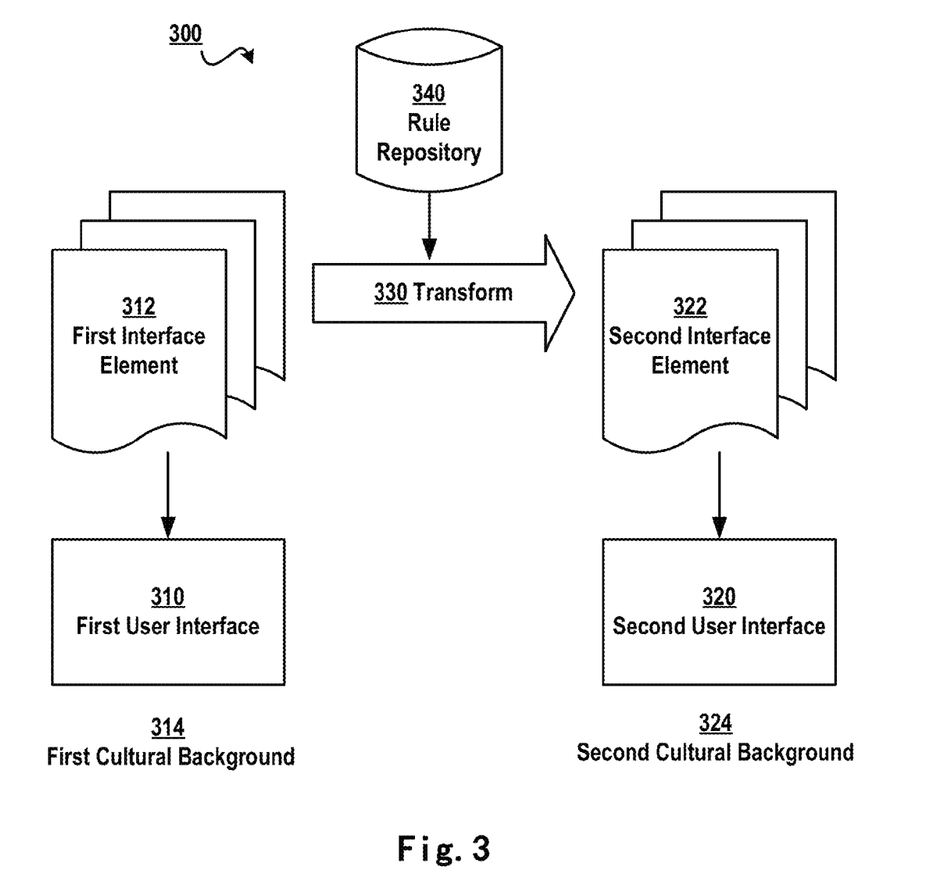
FIG. 3 schematically illustrates a system architecture view according to one embodiment of the present invention.

FIG. 3 schematically illustrates a system architecture view 300 according to one embodiment of the present invention. This figure illustrates a first user interface 310 under a first cultural background 314, which user interface 310 may comprise at least one first interface element 312 (which element 312 may comprise, without limitation, various controls, such as images, buttons, lists, literal labels, etc.). A transformation rule of how to transform one of at least one interface element 312 is stored in a rule repository 340. Rule repository 340 may comprise one or more transformation rules. A second interface element 322 may be obtained by searching in rule repository 340 for an appropriate transformation rule and by transforming (as shown at reference numeral 330) corresponding first interface element 312 based on an action in the appropriate transformation rule. Note rule repository 340 here defines a correspondence between first interface element 312 under first cultural background 314 and second interface element 322 under a second cultural background, wherein second interface element 322 is an interface element that conforms to second cultural background 324. In this manner, a second user interface 320 under second cultural background 324 may be provided to a designer.

Figure 4:
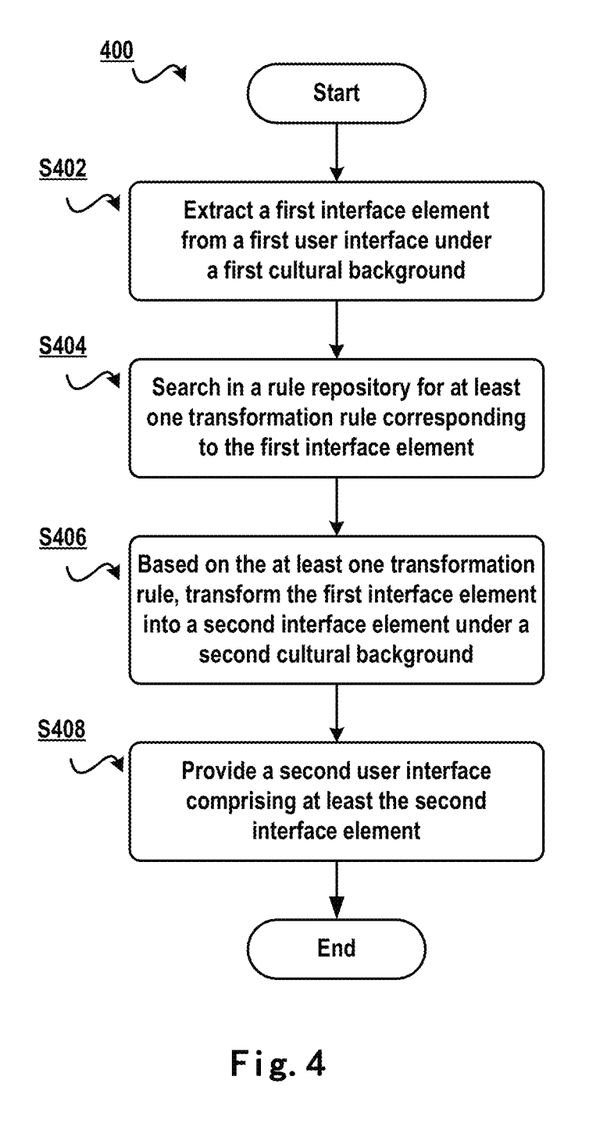
FIG. 4 schematically illustrates a flowchart of a method according to one embodiment of the present invention.

With reference to FIGS. 4-7, the respective embodiments of the present invention will be described below in detail. FIG. 4 schematically illustrates a flowchart 400 of a method according to one embodiment of the present invention. First of all, in step S402 a first interface element is extracted from a first user interface under a first cultural background. In the embodiments of the present invention, the first user interface under the first cultural background is an input to the method. The first user interface here may use a format that is compatible with an interface format outputted by an existing graphical user interface design tool. In this manner, a user interface outputted using an existing graphical user interface design tool (e.g., Maqetta) and the like may be directly used as inputted data in the respective embodiments of the present invention, so as to preview the visual effect of the user interface under a different cultural background.

Note although in FIGS. 2A-2C button controls displayed in Chinese are used as an example of interface elements, interface elements may be various controls and widgets arranged on a user interface, including, without limitation, buttons, images, links, scroll bars, sliders, data pickers, color pickers, lists, input fields, radio buttons, checkboxes, text, audio/visual items and related controls, maps, etc.

In step S404, at least one transformation rule corresponding to the first interface element is searched for in a rule repository, wherein each of the at least one transformation rule comprises at least an action taken on the first interface element. The rule repository may store at least one transformation rule that defines how to transform the first interface element under the first cultural background into a second interface element under a second cultural background. Each interface element may correspond to at least one transformation rule, and different interface elements may correspond to the same or different one or more transformation rules.

In step S406, the first interface element is transformed into the second interface element under the second cultural background. Through step S404, the transformation rule obtained is at least one transformation rule corresponding to the first interface element. Hence, in step S406 each second interface element under the second cultural background may be obtained simply by taking a corresponding action in each transformation rule on the corresponding first interface element.

In step S408, a second user interface comprising at least the second interface element is provided. The second user interface may be provided in various manners; for example, the second user interface may be provided in the form of code with the visual effect provided by decoding the code, or a preview of the visual effect may be directly provided in the form of an image. Thereafter, the process of FIG. 4 ends.

Note in one embodiment of the present invention, part or all of the first interface element may be extracted from the first user interface in step S402. For example, a designer may specify which first interface elements are to be transformed and which are not to be transformed. For example, an interface design under American cultural background might include an English name of a software company; when the interface design is transplanted to Chinese cultural background, it may be specified that the interface element as the English name of the software company is not transformed. Thus, the English name of the software company is still displayed in an interface preview under the Chinese cultural background.

Since a designer may specify that only part of interface elements in a user interface are transformed while the other part of interface elements are kept unchanged, at this point the second user interface provided may be a user interface comprising both the first interface element and the second interface element.

In one embodiment of the present invention, each of the at least one transformation rule further comprises a type of the first interface element. Here, the transformation rule may correspond to the type of the first interface element. Note interface elements comprised in a user interface may have various types. For example, for an interface element of a button type (e.g., the above examples as illustrated in FIGS. 2A-2C), not only the literal content on the button but also a size of the button should be considered; for an interface element of an image type by way of example, these factors do not need to be considered. Hence, considering that the transformation rule comprises the type of the interface element, different actions may be taken on different types of the first interface elements.

In one embodiment of the present invention, the action comprises at least any one of translating, mirroring, formatting and ordering. The action here is an action corresponding to the type of the interface element. For example, for an interface element of a literal label type, a translating action may be taken; for an interface element of an image type, a mirroring action may be taken; for an interface element of a type of date, time and the like, a formatting action may be taken. In addition, some buttons or literal labels may be ordered; for example, when the interface as illustrated in FIG. 2A is transplanted to Arabic cultural background, buttons 210A and 220A may be ordered.

The transformation rule may be defined using various formats, so long as it can associate the type of an interface element with an action taken. For example, each transformation rule may be defined using a tuple (type, action), and a rule repository comprising multiple transformation rules may be defined using a list. Table 1 below illustrates content of a rule repository by way of example:

TABLE 1

| Number | Type | Action |
|---|---|---|
| 1 | Literal Label | Translating |
| 2 | Image | Mirroring |
| ... | | |

The transformation rule may further comprise other content, such as attributes of interface elements (e.g., literal content in literal labels, etc.). Besides, the transformation rule may specify executing the transformation rule when the interface element is transformed into which cultural background; for example, the transformation rule may specify only when the interface element is transformed into a cultural background like Arabic and Hebrew, an image is mirrored. Table 2 below presents an example of a rule defined in eXtensible Markup Language (XML):

TABLE 2

```
0001  <rule id = '1' apply="all">
0002     <element = "label" attribute = "text" action = "translate" >
0003  </rule>
0004  <rule id = '2' apply="all">
0005     <element = "button" attribute = "text" action = "translate" >
0006  </rule>
0007  <rule id = '3' apply="Hebrew, Arabic">
0008     <element = "image" action = "mirror" >
0009  </rule>
0010  <rule id = '4' apply="all">
0011     <element = "label" attribute = "text" action = "format" >
0012  </rule>
```

For example, regarding a transformation rule illustrated on lines 0001-0003, the rule is numbered "1" (rule id='1') and can apply to all cultural backgrounds (apply="all"). Line 0002 means that when a type of an interface element is "label" (element="label"), a translate action (action="translate") is taken on content with an attribute of "text" (attribute="text") in the interface element. A transformation rule 3 illustrated on lines 0007-0009 indicates when a target cultural background is Arabic or Hebrew (apply="Hebrew, Arabic"), a mirror action (action="mirror") is taken on an interface element of an "image" type (element="image"). Based on this principle, those skilled in the art may set a format of a transformation rule according to their own demands.

In one embodiment of the present invention, the extracting a first interface element from a first user interface under a first cultural background comprises: analyzing code that describes the first user interface, so as to obtain metadata of the first interface element.

Figure 5:
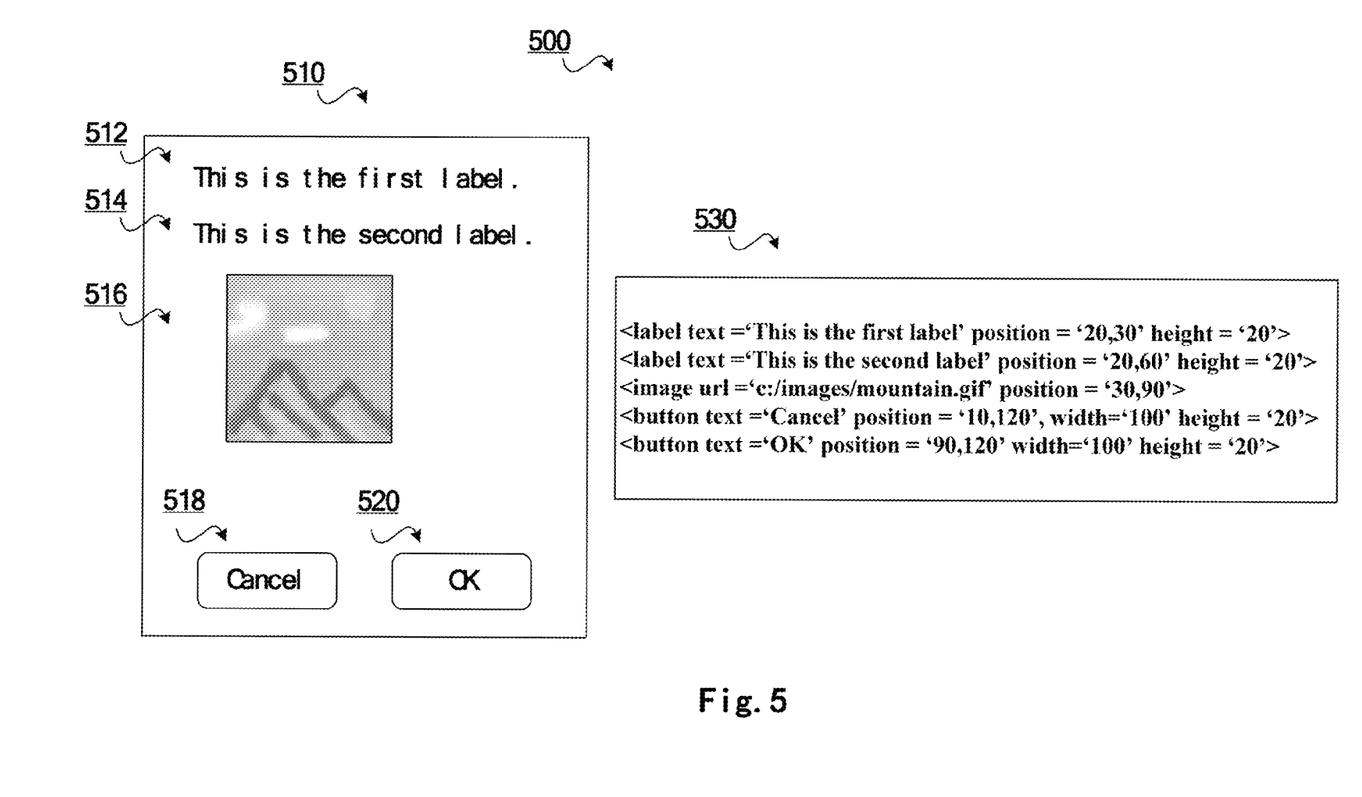
FIG. 5 illustrates a schematic view of metadata of a user interface according to one embodiment of the present invention.

A user interface may be coded using different manners. With reference now to FIG. 5, detailed description is presented regarding how to extract the first interface element from the first user interface under the first cultural background. FIG. 5 illustrates a schematic view 500 of metadata of a user interface according to one embodiment of the present invention. As mentioned above, a user interface may be described in various manners; for example, a user interface format compatible with a Maqetta output format may be used. Description is presented below regarding how to extract an interface element by using as an example a user interface that is represented in Hypertext Markup Language (HTML). Those skilled in the art would appreciate that user interfaces may be represented using other formats (e.g., XML, etc.).

Schematic view 500 illustrated in FIG. 5 consists of two portions: the left side schematically illustrates a user interface 510, and the right side illustrates code 530 of user interface 510 which is represented in HTML. User interface 510 comprises a plurality of controls: two literal labels (corresponding to "label" in HTML) 512 and 514, one image (corresponding to "image" in HTML) 516, and two buttons 518 and 520 (corresponding to "button" in HTML). Table 3 below provides an example of metadata of each interface element in the user interface.

TABLE 3

| 0001 | <label text ='This is the first label' position = '20,30' height = '20'> |
| 0002 | <label text ='This is the second label' position = '20,60' height = '20'> |
| 0003 | <image url ='c:/images/mountain.gif' position = '30,90'> |
| 0004 | <button text ='Cancel' position = '10,120', width='100' height = '20'> |
| 0005 | <button text ='OK' position = '90,120' width='100' height = '20'> |

These interface elements correspond to the lines of code in Table 3: for example, literal label 512 corresponds to the code on line 0001 "<label text='This is the first label' position='20,30' height='20'>," which means that content of literal label 512 is "This is the first label," literal label 512 is positioned at coordinates (20, 30) and has a height of 20; a button 520 corresponds to code on line 0005 "<button text='OK' position='90,120' width='100' height='20'>," which means that content of button 520 is "OK," button 520 is positioned at coordinates (90, 120) and has a width of 100 and a height of 20.

In this embodiment, between each group of brackets "<," ">" there is code representing an interface element. Specifically, in code "<label text='This is the first label' position='20,30' height='20'>," data between "<" and ">" is metadata describing literal label 512. By reading the content of code 530 line by line, metadata of each of interface elements 512-520 may be obtained one by one.

The purpose of obtaining metadata of an interface element is to obtain a type of the interface element from the metadata. In one embodiment of the present invention, the type of the first interface element is obtained from the metadata. Continuing the above example, for interface element 512, the metadata indicates that a type of the interface element is "label," and text content is "This is the first label."

In one embodiment of the present invention, the searching in a rule repository for at least one transformation rule corresponding to the first interface element comprises: selecting at least one transformation rule corresponding to a type of the first interface element. An example of the rule repository has been illustrated in Table 2, and an example of metadata of each interface element in a user interface has been illustrated in Table 3. Searching in the rule repository for a transformation rule corresponding to the first interface element is described by combining the examples of Table 2 and Table 3.

For example, if it is desired to transplant user interface 510 illustrated in FIG. 5 from American cultural background to Arabic cultural background, then transformation rules are selected for interface elements in user interface 510, as illustrated in Table 4 below:

TABLE 4

| Number | Interface Element | Rule |
|---|---|---|
| 1 | 512 | Rules 1, 4 |
| 2 | 514 | Rules 1, 4 |
| 3 | 516 | Rule 3 |
| 4 | 518 | Rule 2 |
| 5 | 520 | Rule 2 |

In one embodiment of the present invention, the transforming the first interface element into a second interface element under a second cultural background based on the at least one transformation rule comprises: taking an action in the transformation rule so as to form the second interface element. Continuing the above example, the action taken on each interface element may be determined based on the rules for the respective transformation rules as illustrated in Table 4. Table 5 below illustrates a list of actions taken on interface elements.

TABLE 5

| Number | Interface Element | Action |
|---|---|---|
| 1 | 512 | Translating, Formatting |
| 2 | 514 | Translating, Formatting |
| 3 | 516 | Mirroring |
| 4 | 518 | Translating |
| 5 | 520 | Translating |

When the Arabic cultural background is selected as the second cultural background, actions illustrated in Table 5 may be defined below:

Translating: translating words related to an interface element from English into Arabic;

Mirroring: mirroring an image related to an interface element;

Formatting: displaying in bold the words related to an interface element.

When actions as illustrated in Table 5 are taken on each interface element in user interface 510 illustrated in FIG. 5, the appearance of user interface 510 will change such that words in literal labels 512 and 514 are translated into Arabic and displayed in bold, words in buttons 518 and 520 are translated into Arabic, and image 516 moves from the left to the right of the interface.

Those skilled in the art may define actions taken on different interface elements according to their demands. For example, it may be prescribed when a user interface is transplanted to an Arabic environment, interface elements such as buttons, lists and tables are mirrored. In this case, buttons 518 and 520 in FIG. 5 will exchange their order.

In one embodiment of the present invention, the meaning of each action may be defined. For example, "translating" may be defined to translate literal content from a language under the first cultural background to a language under the second cultural background (e.g., translating English into Arabic); "mirroring" may be defined to move a position of an image to another position that is symmetrical with respect to a central axis of the user interface (for example, image 516 in FIG. 5 is mirrored from the left of the user interface to the right of the user interface); "formatting" may be defined to format the literal content, for example, adjusting font size, font style, text color, or displaying in bold, italic, etc.

Meaning of several actions have been enumerated by way of example, and those skilled in the art may define a function based on their specific demands. For example, for an interface element of an image type, a specific action may be defined to apply various image processing algorithms on the image; for an interface element of a color picker type, the color picker may be transformed from RGB color space into HSV color space; and for an interface element of a data picker type, the date packer may be transformed from the Gregorian calendar into a calendar under a specific cultural background (e.g., the Chinese Lunar calendar). Further, content of specific text may be transformed, for example, a metric unit "kilogram" being transformed into an English unit "pound," etc.

In one embodiment of the present invention, the translating comprises at least any one of pseudo translating, machine translating and real translating.

Note the embodiments of the present invention are not intended to translate words in the graphical user interface but to transform user interface design under a cultural background into visual presentation meeting a target cultural background. Hence, "translating/translation" mentioned in the present invention is not necessarily accurate translation in the traditional sense, but to use pseudo translation, machine translating or real translating for obtaining words in a user interface under the target cultural background.

Pseudo translating means mapping characters in a source language to characters in a target language, where the target language is just simulated visually while an output result might have no real meaning. For example, when translating a literal label "Hello world!" from English into Chinese, each English word may be replaced by predefined Chinese characters, for example, outputting "无极天地！"

Machine translating refers to translating using a currently available machine translating engine, and real translating refers to translating in the conventional sense. Note whichever translating is used, consideration should be given to the length of the words in a target language. For example, the translated word length may be set to be longer than the original length, so as to avoid the phenomenon that words cannot be completely displayed on buttons as illustrated in FIGS. 2A-2C after the completion of software development.

In one embodiment of the present invention, the first cultural background and the second cultural background comprise at least any one of writing language, writing direction, date format, time format, currency format, display order, calendar type and unit format. The writing language refers to a language in which words are displayed on each interface element of the user interface, the writing direction refers to the direction of words (for example, Chinese and English is written in a left-to-right direction, while Arabic and Hebrew is written in a right-to-left direction), the date format refers to an arrangement order of year/month/date while displaying a date (e.g., year/month/date or month/date/year), and the time format means whether to use a 12 hour system or a 24 hour system, etc.

For example, usually date is displayed in a "year/month/date" format (e.g., 2012/09/14) under the first cultural background and displayed in a "month/date/year" format under the second cultural background (e.g., 09/14/2012). In order to help designers to understand user experience under the second cultural background, the format of time display also needs to be transformed.

Figure 6:
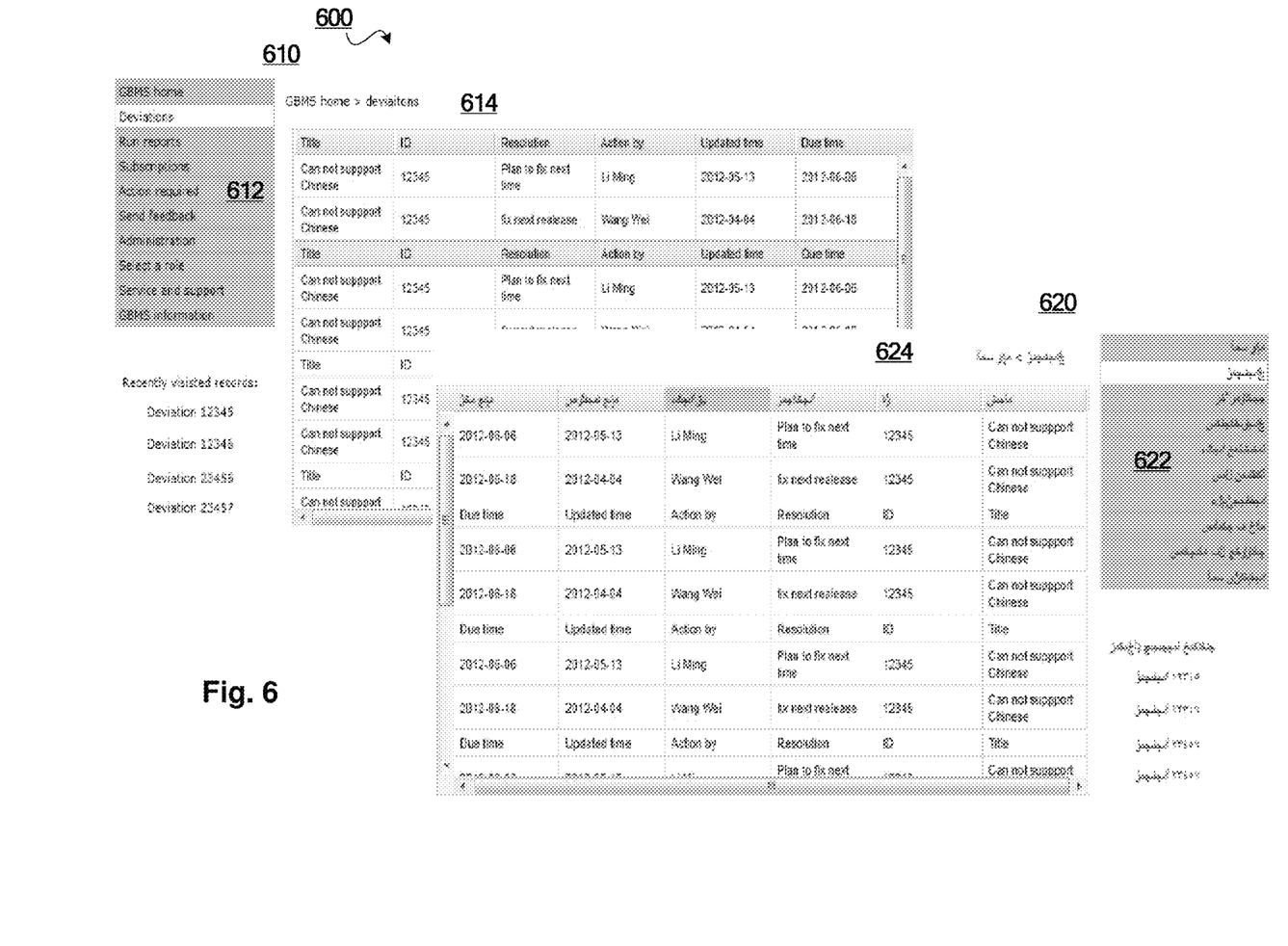
FIG. 6 schematically illustrates a diagram of transforming a user interface under a first cultural background into a user interface under a second cultural background according to one embodiment of the present invention.

FIG. 6 schematically illustrates a diagram 600 of transforming a user interface under a first cultural background into a user interface under a second cultural background according to one embodiment of the present invention. As illustrated in FIG. 6, a user interface 610 on the left illustrates a user interface under a first cultural background (American cultural background). This interface comprises a list 612 and a table 614, a writing language is English and a writing direction is from left to right. A user interface 620 on the right of FIG. 6 illustrates a user interface under a second cultural background (Arabic cultural background). This interface comprises a list 622 and a table 624, in which the writing language is Arabic and the writing direction is from right to left.

Generally speaking, due to different writing directions, interface elements (e.g., list 622 and table 624) in user interface 620 are generally in a mirroring relationship with interface elements (e.g., list 612 and table 614) in user interface 610. For example, the order of columns in table 624 is opposite to the order of columns in table 614. However, words in different languages may be present in a user interface provided finally, and writing directions of the words in these languages may be identical or different. In user interface 610, the content displayed in table 614 is, for example, a form in a database, and the form is illustrated in English. In transformed interface 620, although the words in the user interface are transformed into Arabic, the content in the data form is still in English. At this point, bidirectional display occurs in the user interface.

Note a code example of the user interface and an example of the rule repository have been schematically illustrated above, whereas those skilled in the art may further define using which format to represent the user interface and the rule repository according to specific demands. For example, HTML in conjunction with a CSS (Cascading Style Sheet) selector may be used for defining the user interface and rule repository in a manner below:

User Interface:

```
<div dvwidget="jquery.ui.button" title="My Button" style="font-size: 10pt;">
<button id="widget_1982">
Button</button>
<script>$("#widget_1982").button( );</script>
</div>
```

Rule Repository:

```
    <rule selector="span[data-dojo-type="dojox.grid.DataGrid"] " >
    <translation apply="attribute">structure</translation>
    </rule>
    <rule selector="div[dvwidget="jquery.ui.button"] " >
    <translation apply="text">null</translation>
    </rule>
```

-continued

```
<rule selector=".calendar_class">
  <format>calendar</format>
</rule>
```

Figure 7:
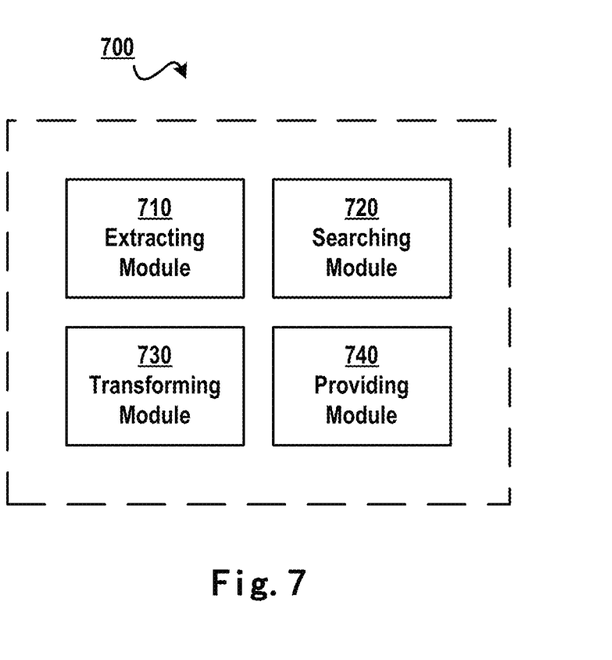
FIG. 7 schematically illustrates a block diagram of an apparatus according to one embodiment of the present invention.

FIG. 7 schematically illustrates a block diagram 700 of an apparatus according to one embodiment of the present invention. In this embodiment, there is provided an apparatus for assisting GUI design, comprising: an extracting module 710 configured to extract a first interface element from a first user interface under a first cultural background; a searching module 720 configured to search in a rule repository for at least one transformation rule corresponding to the first interface element; a transforming module 730 configured to, based on the at least one transformation rule, transform the first interface element into a second interface element under a second cultural background; and a providing module 740 configured to provide a second user interface comprising at least the second interface element; wherein each of the at least one transformation rule comprises at least an action taken on the first interface element.

In one embodiment of the present invention, each of the at least one transformation rule includes a type of the first interface element.

In one embodiment of the present invention, the action comprises at least any one of translating, mirroring, formatting and ordering.

In one embodiment of the present invention, extracting module 710 comprises: a first obtaining module configured to analyze code that describes the first user interface, so as to obtain metadata of the first interface element.

In one embodiment of the present invention, there is further provided a second obtaining module configured to obtain a type of the first interface element from the metadata.

In one embodiment of the present invention, searching module 720 comprises: a selecting module configured to select at least one transformation rule corresponding to the type of the first interface element.

In one embodiment of the present invention, transforming module 730 comprises: an executing module configured to perform an action in the transformation rule to form the second interface element.

In one embodiment of the present invention, the translating comprises at least any one of pseudo translating, machine translating and real translating.

In one embodiment of the present invention, the first cultural background and the second cultural background comprises at least any one of: writing language, writing direction, date format, time format, currency format, display order, calendar type and unit format.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for assisting graphical user interface design, the method comprising:
   storing in a rule repository a plurality of transformation rules, wherein each of the plurality of transformation rules specifies an interface element type of a user interface element and an associated action to be taken on user interface elements of the specified interface element type;
   extracting first and second interface elements from a first graphical user interface (GUI) associated with a first cultural background, wherein the first and second interface elements are both of a first interface element type;
   locating in the rule repository at least a first transformation rule that specifies the first interface element type and an associated first action;
   in response to locating the first transformation rule and utilizing the first action specified by the first transformation rule, transforming the first and second interface elements into third and fourth interface elements, respectively, wherein the third and fourth interface elements are associated with a second cultural background; and
   providing a second GUI including at least the third and fourth interface elements.

2. The method according to claim 1, wherein the first action includes at least one of a set including translating, mirroring, formatting and ordering.

3. The method according to claim 1, wherein the extracting the first and second interface elements comprises:
   obtaining metadata of the first and second interface elements by analyzing code that describes the first GUI.

4. The method according to claim 3, further comprising obtaining the first interface element type of the first and second interface elements from the metadata.

5. The method according to claim 1, wherein the first cultural background and the second cultural background include at least one of:
   writing language, writing direction, date format, time format, currency format, display order, calendar type and unit format.

6. The method of claim 1, wherein:
   the first GUI includes a fifth interface element of an image interface element type;
   the method further includes:
      locating in the rule repository a second transformation rule that specifies the image interface element type;
      utilizing a second action specified by the second transformation rule, transforming the fifth interface element into a sixth interface element associated with the second cultural background; and
providing the second GUI includes providing the second GUI including the sixth interface element.

7. The method of claim 1, and further comprising:
qualifying applicability of a transformation rule to interface elements of the first GUI by both interface element type and by a written human language utilized in the second GUI.

8. The method of claim 1, wherein:
the locating includes locating in the rule repository a second transformation rule applicable to the first interface element, wherein the second transformation rule specifies a second action;
the transforming includes also transforming the first interface element utilizing the second action specified by the second transformation rule;
the first action includes one of a set including textual translation and resizing the first interface element; and
the second action includes an action other than textual translation and other than resizing the first interface element.

9. A program product, comprising:
a data storage device; and
program code stored within the data storage device that, when executed by a computer, causes the computer to perform:
  extracting first and second interface elements from a first graphical user interface (GUI) associated with a first cultural background, wherein the first and second interface elements are both of a first interface element type;
  in a rule repository including a plurality of transformation rules each specifying an interface element type and associated action to be taken on user interface elements of the specified interface element type, locating a first transformation rule that specifies the first interface element type and an associated first action;
  in response to locating the first transaction rule and utilizing the first action specified by the first transformation rule, transforming the first and second interface elements into third and fourth interface elements, respectively, wherein the third and fourth interface elements are associated with a second cultural background; and
  providing a second GUI including at least the third and fourth interface elements.

10. The program product according to claim 9, wherein the first action includes at least one of a set including translating, mirroring, formatting and ordering.

11. The program product according to claim 9, wherein the extracting comprises:
obtaining metadata of the first and second interface elements by analyzing code that describes the first GUI.

12. The program product according to claim 11, wherein the program code further causes the computer to perform obtaining the first interface element type of the first and second interface elements from the metadata.

13. The program product according to claim 9, wherein the first cultural background and the second cultural background include at least one of:
writing language, writing direction, date format, time format, currency format, display order, calendar type and unit format.

14. The program product of claim 9, wherein:
the first GUI includes a fifth interface element of an image interface element type;
the program code, when executed, further causes the computer to perform:
  locating in the rule repository a second transformation rule that specifies the image interface element type;
  utilizing a second action specified by the second transformation rule, transforming the fifth interface element into a sixth interface element associated with the second cultural background; and
providing the second GUI includes providing the second GUI including the sixth interface element.

15. The program product of claim 9, wherein the program code, when executed, further causes the computer to perform:
qualifying applicability of a transformation rule to interface elements of the first GUI by both interface element type and by a written human language utilized in the second GUI.

16. The program product of claim 9, wherein:
the locating includes locating in the rule repository a second transformation rule applicable to the first interface element, wherein the second transformation rule specifies a second action;
the transforming includes also transforming the first interface element utilizing the second action specified by the second transformation rule;
the first action includes one of a set including textual translation and resizing the first interface element; and
the second action includes an action other than textual translation and other than resizing the first interface element.

17. A data processing system, comprising:
a processor;
a data storage device coupled to the processor; and
program code stored within the data storage device that, when executed by the processor, causes the data processing system to perform:
  extracting first and second interface elements from a first graphical user interface (GUI) associated with a first cultural background, wherein the first and second interface elements are both of a first interface element type;
  in a rule repository including a plurality of transformation rules each specifying an interface element type and associated action to be taken on user interface elements of the specified interface element type, locating a first transformation rule that specifies the first interface element type and an associated first action;
  in response to locating the first transformation rule and utilizing the first action specified by the first transformation rule, transforming the first and second interface elements into third and fourth interface elements, respectively, wherein the third and fourth interface elements are associated with a second cultural background; and
  providing a second GUI including at least the third and fourth interface elements.

18. The data processing system according to claim 17, wherein the first action includes at least one of a set including translating, mirroring, formatting and ordering.

19. The program product according to claim 17, wherein the extracting comprises:
obtaining metadata of the first and second interface elements by analyzing code that describes the first GUI.

20. The data processing system of claim 17, wherein:
the first GUI includes a fifth interface element of an image interface element type;
the program code, when executed, further causes the computer to perform:
  locating in the rule repository a second transformation rule that specifies the image interface element type;
  utilizing a second action specified by the second transformation rule, transforming the fifth interface element into a sixth interface element associated with the second cultural background; and
providing the second GUI includes providing the second GUI including the sixth interface element.

* * * * *